United States Patent [19]

Ramer

[11] 4,089,761

[45] May 16, 1978

[54] METHOD FOR TREATING SEWAGE

[76] Inventor: James L. Ramer, Rte. 1, Box 155, Sullivan, Mo. 63080

[21] Appl. No.: 760,482

[22] Filed: Jan. 19, 1977

Related U.S. Application Data

[62] Division of Ser. No. 730,104, Oct. 6, 1976.

[51] Int. Cl.$^2$ ............................................. C02C 5/12
[52] U.S. Cl. .................................. 204/149; 204/129; 210/63 R; 210/64
[58] Field of Search ............... 204/149, 152, 151, 129; 210/63 R, 64

[56] References Cited

U.S. PATENT DOCUMENTS

| | | | |
|---|---|---|---|
| 478,048 | 6/1892 | Collins | 204/149 |
| 3,664,951 | 5/1972 | Armstrong | 204/149 X |
| 3,684,703 | 8/1972 | Marmo | 204/149 X |
| 3,914,165 | 10/1975 | Clark | 204/149 |
| 3,925,176 | 12/1975 | Okert | 204/152 |
| 3,975,247 | 8/1976 | Stralser | 204/152 |

Primary Examiner—Arthur C. Prescott
Attorney, Agent, or Firm—Thomas O. Maser

[57] ABSTRACT

There is provided a method and apparatus for treating sewage, by first comminuting raw sewage in a comminuting compartment to provide a slurry and then digesting the raw, comminuted sewage by oxygen-dependent bacteria in a roofed compartment. Oxygen is supplied by electrolysis of the water in the sewage, utilizing spaced anode and cathode. The anode is located in the roofed digestion compartment, and the oxygen generated at the anode is used by the bacteria; the cathode is located in a chimney which extends through the roof or top of the plant, to atmosphere, and the hydrogen generated at the cathode is discharged to atmosphere through this chimney. A stirrer is provided in the digestion compartment to stir trapped oxygen back into the mass of sludge. A trapping or sedimentation compartment is provided after the digestion compartment, for settling out indigestible solids, and drawing off the remaining liquid.

2 Claims, 2 Drawing Figures

METHOD FOR TREATING SEWAGE

This is a division of application Ser. No. 730,104, filed Oct. 6, 1976.

BACKGROUND OF THE INVENTION

The present invention relates to a method and apparatus of treating sewage, by bacteria digestion with oxygen supplied by electrolysis.

The treatment of sewage by bacteria which attacks and breaks down the constituents of the sewage is well known. Such bacteria is usually oxygen-dependent so that there must be supplied to the plant oxygen in some form. In a number of installations, the oxygen has been supplied by the introduction of air into the compartment in which the bacteria acts upon the sewage, known as a digester. It has also been suggested in some instances that oxygen be supplied be electrolysis of the water constituent of the sewage.

Where electrolysis has been used for the supply of oxygen to the bacteria which digests the sewage sludge, the anodes and cathodes of the electrolysis system have been placed generally in the same tank, so that escaping hydrogen and oxygen gases, from the sludge, were free to reunite. This resulted in a fire and explosion hazard, where these gases were permitted to evolve from the surface of the sludge into a space above the sludge, and beneath a cover. In other embodiments, there was no cover for the digester compartment, so that the gases were permitted to escape, haphazardly, into the atmosphere.

In another proposal, the electrolysis took place in high pressure electrolytic units, which generated hydrogen and oxygen, and which gases were fed under pressure through a pressure engine, and thence into separate storage tanks. This proposal required substantial equipment for handling and storing gases under high pressure, and was therefore expensive to construct.

Sewage treatment plants as presently proposed are intended for handling the sewage of relatively large populations, but there is, also, a need for the treatment of sewage generated by communities having smaller populations, as are sometimes found on, for example, smaller military installations. The known sewage treatment plants require substantial treatment facilities, including relatively large peripheral and support equipment. Also, effluent from sewage treatment plants has not been as clean as desirable, thereby making the provision of discharge of the effluent difficult to achieve, and restricted to a relatively few methods. Further, the effluents from known plants provide the danger of contamination to the environment, as well as certain unsightliness in the effluent disposal.

SUMMARY OF THE INVENTION

The present invention provides a method and apparatus for treatment of sewage, utilizing the digestion of sewage sludge, after it has been comminuted, by bacteria which are oxygen-dependent. The oxygen is supplied by the electrolysis of the water forming part of the sewage slurry. To this end, there is provided a digestion compartment in which the digestion of the sewage takes place, with an anode located therein, so that the oxygen generated at the anode is utilized by the bacteria. A chimney is provided in the digestion compartment, and the cathode of the electrolysis apparatus is located in the chimney. The chimney extends through the roof or top of the digestion compartment, so that hydrogen generated at the cathode is discharged into the atmosphere through the chimney. The chimney is provided with openings in its lower portion, so as to provide for free communication between the interior of the chimney and the remainder of the digestion compartment. The construction of the chimney which permits the hydrogen to escape thereby eliminates the danger of explosion or fire from recombining of the hydrogen and oxygen, or from some other cause related to accumulation of hydrogen. The roofed construction of the digestion compartment traps the oxygen which passes through the sludge, and escapes from the mass or body therefore, so that this oxygen remains in contact with the upper layer of bacteria. A stirrer is provided in the compartment to stir the sewage and reintroduce a portion of the trapped oxygen back into the sewage mass. There is a comminuting compartment, with a comminuting stirrer in the form of a revolving blade, this being used for initially comminuting any solid portions of the sewage being introduced into the plant. Downstream of the digestion compartment is a trapping or sedimentation compartment, wherein indigestable solids are settled out, and liquid is drawn off.

The hereinabove described invention method and apparatus provides for more complete digestion of sewage before treatment, so as to permit smaller and less expensive plants to be built. As a result of requiring less treatment facilities, less peripheral and support equipment will be required, thereby allowing the utilization of small sewage treatment plants for communities having relatively small populations. By virtue of the hereinabove described method and apparatus, the effluent is cleaner than heretofore, thereby permitting easier and more diverse methods of discharge, with less danger of contamination to the surroundings, or less chance of producing an unsightly condition due to the effluent discharge.

An object of the present invention is to provide an improved method and apparatus involving treatment of sewage by digestion thereof with oxygen-dependent bacteria.

Another object of the present invention is the provision of an electrolysis system for sewage treatment in which oxygen is supplied by electrolysis, and hazard from fire and/or explosion is minimized.

Another object of the present invention is to provide a sewage treatment method and apparatus in which oxygen is supplied to oxygen-dependent bacteria by electrolysis and the generated oxygen is maintained separately from the generated hydrogen, with venting of the hydrogen.

Yet another object of the present invention is the provision of a method and apparatus for sewage treatment in which oxygen is trapped and maintained in contact with the bacteria, and in which bacteria support is additionally provided by a stirring action.

Other objects of the present invention include the provision of a sewage treatment method and apparatus providing for more complete digestion of sewage before treatment, while another object of the present invention is the provision of a relatively small sewage treatment plant capable of handling relatively small populations.

Another object of the present invention is the provision of a sewage treatment plant providing for relatively clean effluent.

Other objects and many of the attendant advantages of the present invention will become apparent from a study of the following description taken in conjunction with the drawings.

DESCRIPTION OF THE PREFERRED EMBODIMENT

Figure 1:
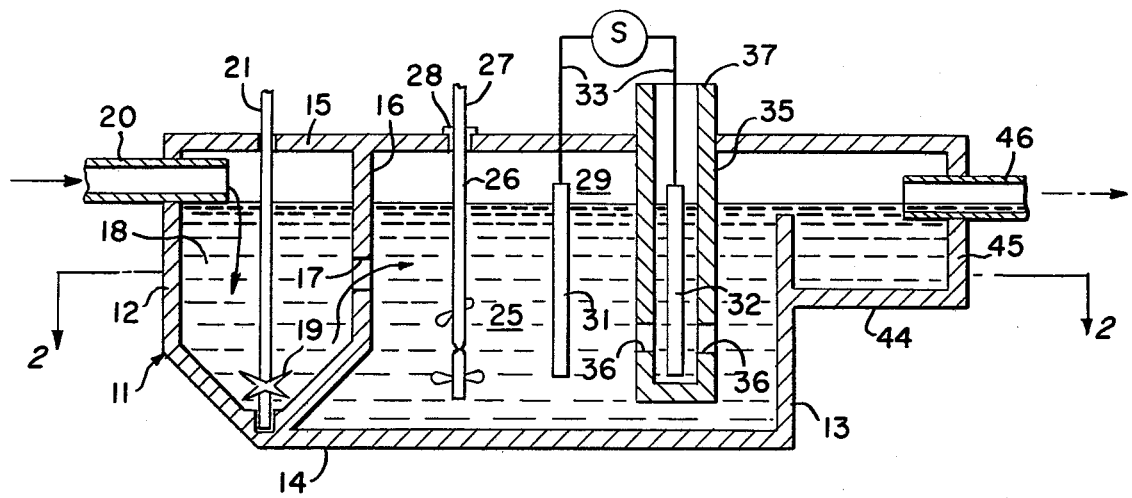
FIG. 1 is a cross sectional view of a plant embodying the method and apparatus of the present invention.

Referring now to the drawings, wherein like or corresponding reference numerals are used to designate like or corresponding parts throughout the several views, there is shown in FIG. 1 a vertical cross sectional view of a plant for the treatment of sewage, in accordance with the method and apparatus of the present invention. The sewage plant, generally designated 10, includes a housing 11 and an end wall 12, opposite which is a second end wall 13, a floor 14 and a roof 15. An intermediate dividing wall 16 is provided, with an opening 17 therein, and an inlet conduit 20 extends through the end wall 12, for the introduction of raw sewage. End wall 12 and intermediate wall 16 provide between them a comminuting compartment 18, in which is a multi-bladed comminuting device 19, driven by a shaft 21, connected to a suitable source of power (not shown). Sewage introduced through the conduit 20 is thus comminuted by the bladed device 19, and then exits from the comminuting compartment 18 through the opening 17. The opening in the roof through which shaft 21 passes is preferably made sufficiently large to allow a free flow of air into the compartment 18. The comminuting device 19 besides acting as a comminutor, also draws the air downward into the sewage as the sewage is being ground into a slurry, thereby providing oxygen to start the digestion process. The oxygen enriched slurry then enters into the digestion compartment 25, in which is located a mass or body of sewage, together with bacteria which is oxygen-dependent. A stirrer 26 is provided, including a shaft 27 that extends through the roof 15. Roof 15 will be seen to be connected to the intermediate wall 16 in a sealing manner, and to the side walls 22 and 23 (see FIG. 2) of the housing 11. A seal 28 is provided around the shaft 27, to seal off the space 29 lying above the mass of sewage and bacteria within the digestion compartment 25.

There is also provided in the digestion compartment 25 an electrolysis system, including specifically an anode 31 and a cathode 32, both connected by suitable electrical conduits 33 to a source of electrical energy S.

A chimney 35 is provided in the digestion compartment 25, having openings 36 at the lower portion thereof, so as to communicate the interior of the chimney 35 with the fluid material in the digestion compartment 25. At its upper end 37, the chimney 35 is provided with a vent, which is in communication with atmosphere.

The end wall 13 extends to a level which is slightly below the level of the mass of sewage and bacteria in the digestion compartment 25, and serves thereby to separate the digestion compartment 25 from a sedimentation compartment 40, bounded by a floor portion 44 and an end wall 45. An outlet conduit 46 is provided, so that liquid may flow out of the plant 10, while sediment which settles to the bottom of the sedimentation compartment 40 may be removed by any conventional means.

Figure 2:
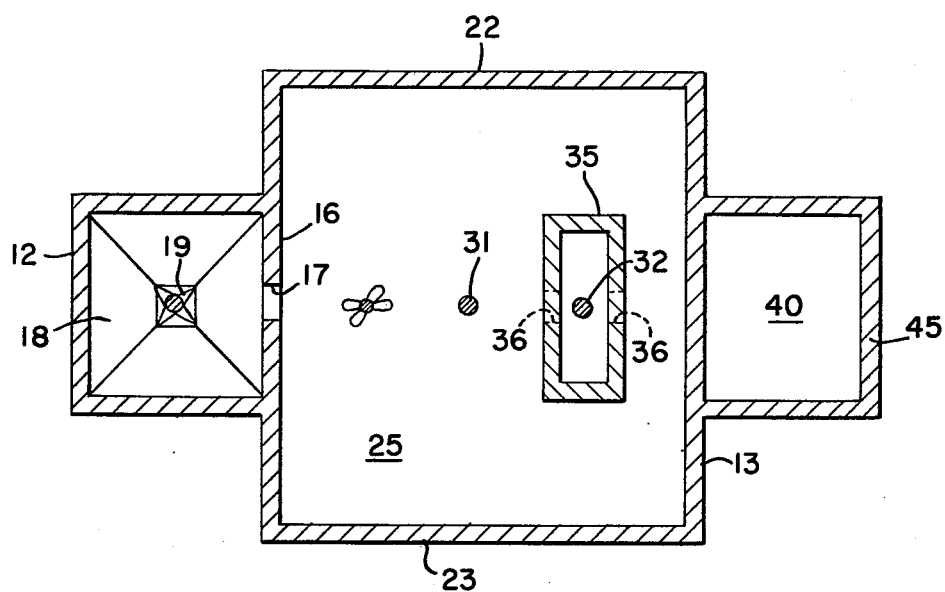
FIG. 2 is a cross sectional view taken on the line 2—2 of FIG. 1.

Referring now to FIG. 2, there may be seen the comminuting compartment 18, bounded by the end wall 12 and the intermediate wall 16. There may be seen also the opening 17 in the intermediate wall 16, as well as the multi-bladed comminuting device 19. In FIG. 2 there may be seen the walls 22 and 23 of the digestion compartment 25. There may also be seen the anode 31 and the cathode 32, as well as chimney 35. Further, there is shown the sedimentation compartment 40.

Referring again to FIG. 1, it will be seen that the roof 15 extends over the digestion 25, being sealingly connected to the intermediate wall 16, as well as to the end wall 45 of the sedimentation compartment 40. Thus, the space 29 above the digestion compartment is substantially sealed against the escape of gas.

When the source S supplies electrical energy to the electrolysis system, oxygen is generated at the anode 31, and hydrogen is generated at the cathode 32, due to the electrolysis of the water within the sewage mass in the digestion compartment 25. The hydrogen passes upwardly through the chimney 35 exiting from the upper end thereof, so as to be vented to atmoshphere. The oxygen which is generated at the anode 31 is substantially trapped in the space 29, and thereby the hydrogen and oxygen are maintained separate. It will be understood that a substantial portion of the generated oxygen is utilized by the bacteria, but that some of it will escape from the mass of material in the compartment 25 and be trapped, as above noted, in the space 29. The stirrer 26 causes the mass of sewage and bacteria to be agitated, so as to reintroduce into that mass some of the oxygen which is in the space 29, thereby assuring further use of the oxygen, enhancing the activity of the bacteria in its function of digesting the sewage in the digestion compartment 25.

Accordingly, the hereinabove described method and apparatus provide for venting of the hydrogen, so as to avoid fire and explosion, while providing for trapping of any excess oxygen, and stirring of the mass so as to reintroduce at least some of the trapped oxygen back into the mass, for utilization by the bacteria.

It will be obvious to those skilled in the art that various changes may be made without departing from the spirit of the invention, and therefore the invention is not limited to what is shown in the drawings and described in the specification but only as indicated in the appended claims.

I claim:

1. The method of treating raw sewage comprising:
   (a) comminuting raw sewage to provide an aqueous slurry,
   (b) digesting said sewage slurry by oxygen-dependent bacteria,
   (c) generating oxygen for said bacteria by electrolysis, and simultaneously generating hydrogen,
   (d) maintaining said hydrogen separate from said oxygen,
   (e) preventing the escape of oxygen from the vicinity of the bacteria, and
   (f) venting said hydrogen.

2. The method of claim 1 and further comprising stirring said slurry to incorporate a portion of the trapped oxygen thereinto.

* * * * *